United States Patent [19]

Min

[11] Patent Number: 4,658,195

[45] Date of Patent: Apr. 14, 1987

[54] MOTOR CONTROL CIRCUIT WITH AUTOMATIC RESTART OF CUT-IN

[75] Inventor: Young-Kee Min, Milwaukee, Wis.

[73] Assignee: PT Components, Inc., Milwaukee, Wis.

[21] Appl. No.: 736,454

[22] Filed: May 21, 1985

[51] Int. Cl.$^4$ .............................................. H02P 1/42
[52] U.S. Cl. ..................................... 318/786; 318/778
[58] Field of Search ................................ 318/786, 778

[56] References Cited

U.S. PATENT DOCUMENTS

| | | |
|---|---|---|
| 1,974,989 | 9/1934 | Hamm . |
| 2,181,734 | 11/1939 | Mooney . |
| 2,576,084 | 11/1951 | Trevitt . |
| 2,774,021 | 12/1956 | Ehret . |
| 2,919,391 | 12/1959 | Charbonneaux . |
| 2,929,978 | 3/1960 | Petrocelli . |
| 2,991,402 | 7/1961 | Imada et al. . |
| 3,071,717 | 1/1963 | Gordon . |
| 3,071,718 | 1/1963 | Gordon . |
| 3,116,445 | 12/1963 | Wright . |
| 3,202,899 | 8/1965 | Gambill et al. . |
| 3,226,620 | 12/1965 | Elliott et al. . |
| 3,258,668 | 6/1966 | Milligan . |
| 3,307,093 | 2/1967 | Wright . |
| 3,349,307 | 7/1967 | Licata et al. . |
| 3,414,789 | 12/1968 | Prouty . |
| 3,421,064 | 1/1969 | Phillips . |
| 3,453,516 | 7/1969 | Conner . |
| 3,530,348 | 9/1970 | Conner . |
| 3,573,579 | 6/1971 | Lewus . |
| 3,667,017 | 5/1972 | Ramirez . |
| 3,671,830 | 6/1972 | Kruper . |
| 3,761,792 | 9/1973 | Witney et al. . |
| 3,766,457 | 10/1973 | Fink, Jr. et al. . |
| 3,777,232 | 12/1973 | Woods et al. . |

List Continued on next page.

FOREIGN PATENT DOCUMENTS 0027524 11/1981 European Pat. Off. .
1142248 12/1969 United Kingdom .

OTHER PUBLICATIONS

SCR Manual, Fourth Edition, General Electric, 1967, pp. 222–223, General Electric Company, Dept. B 3800 North Milwaukee Avenue, Chicago, IL 60641.
"Single-Phase Two-Valued Capacitor Motor Relay Section", D. L. Trower and C. Evert, AIEE Transactions, Feb. 1962, pp. 1141–1143.
Excerpted from the article "What's New in Rotary Speed Switches", by Milton Leonard, Associate Editor, Machine Design, Jul. 27, 1972, Copyright 1972, by the Penton Publishing Co., Cleveland, Ohio.
"Load Sentinel", Scovill Products, Production Engineering, Mar. 1984.
Macrostart brochure, by Macrotronix, Inc. 4016 North Home St., Mishawaka, In USA 46545, Copyright 1985, by Macrotronix, Inc.

Primary Examiner—David Smith, Jr.
Attorney, Agent, or Firm—Andrus, Sceales, Starke & Sawall

[57] ABSTRACT

A control circuit (10) is provided for automatically re-applying starting torque to a single phase AC induction motor by reconnecting the auxiliary or starting winding (2) to the AC power source (3) if the motor has not accelerated to a given cut-out speed, or otherwise begins to stall. Multiple reconnections of the auxiliary winding (2) are automatically provided as needed, without external intervention, to provide multiple bumping action. The auxiliary winding (2) is connected to the AC source (3) during initial energization of the motor, and is disconnected after a given starting interval. Induced voltage in the auxiliary winding (2) is sensed and compared against a reference voltage (17) for reconnecting the auxiliary winding (2) when the sensed auxiliary winding voltage drops below a given value relative to the reference voltage. The disconnecting, sensing and reconnecting functions are accomplished with a minimum number of components.

5 Claims, 3 Drawing Figures

U.S. PATENT DOCUMENTS

| | | |
|---|---|---|
| 3,792,324 | 2/1974 | Suarez et al. |
| 3,859,591 | 5/1975 | Saunders |
| 3,882,364 | 5/1975 | Wright et al. |
| 3,895,275 | 7/1975 | Rostad |
| 3,950,657 | 5/1976 | Sheng et al. |
| 3,970,908 | 7/1976 | Hansen et al. |
| 4,065,804 | 12/1977 | Rostad |
| 4,072,880 | 2/1978 | Oshima et al. |
| 4,145,646 | 3/1979 | Werderitch |
| 4,152,758 | 5/1979 | Bailey et al. |
| 4,292,555 | 9/1981 | Schaefer |
| 4,307,327 | 12/1981 | Streater et al. |
| 4,325,012 | 4/1982 | Schaefer |
| 4,361,792 | 11/1982 | Davis, Jr. et al. |
| 4,366,426 | 12/1982 | Turlej |
| 4,375,613 | 3/1983 | Fuller et al. |
| 4,382,217 | 5/1983 | Horner et al. |
| 4,395,671 | 7/1983 | Sandler et al. |
| 4,399,394 | 8/1983 | Ballman |
| 4,401,933 | 8/1983 | Davy et al. |
| 4,422,023 | 12/1983 | Iwasawa et al. |
| 4,422,030 | 12/1983 | McAllise |
| 4,453,118 | 6/1984 | Phillips et al. |
| 4,468,604 | 8/1984 | Zaderej |
| 4,496,895 | 1/1985 | Kawate et al. |

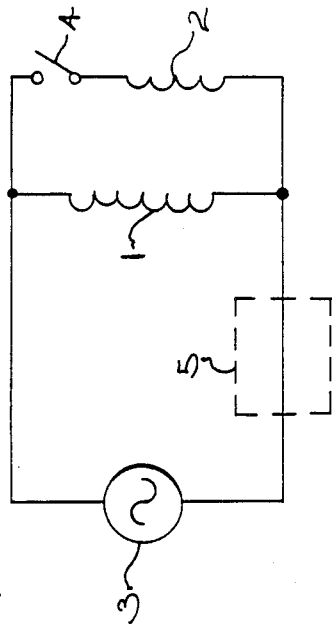
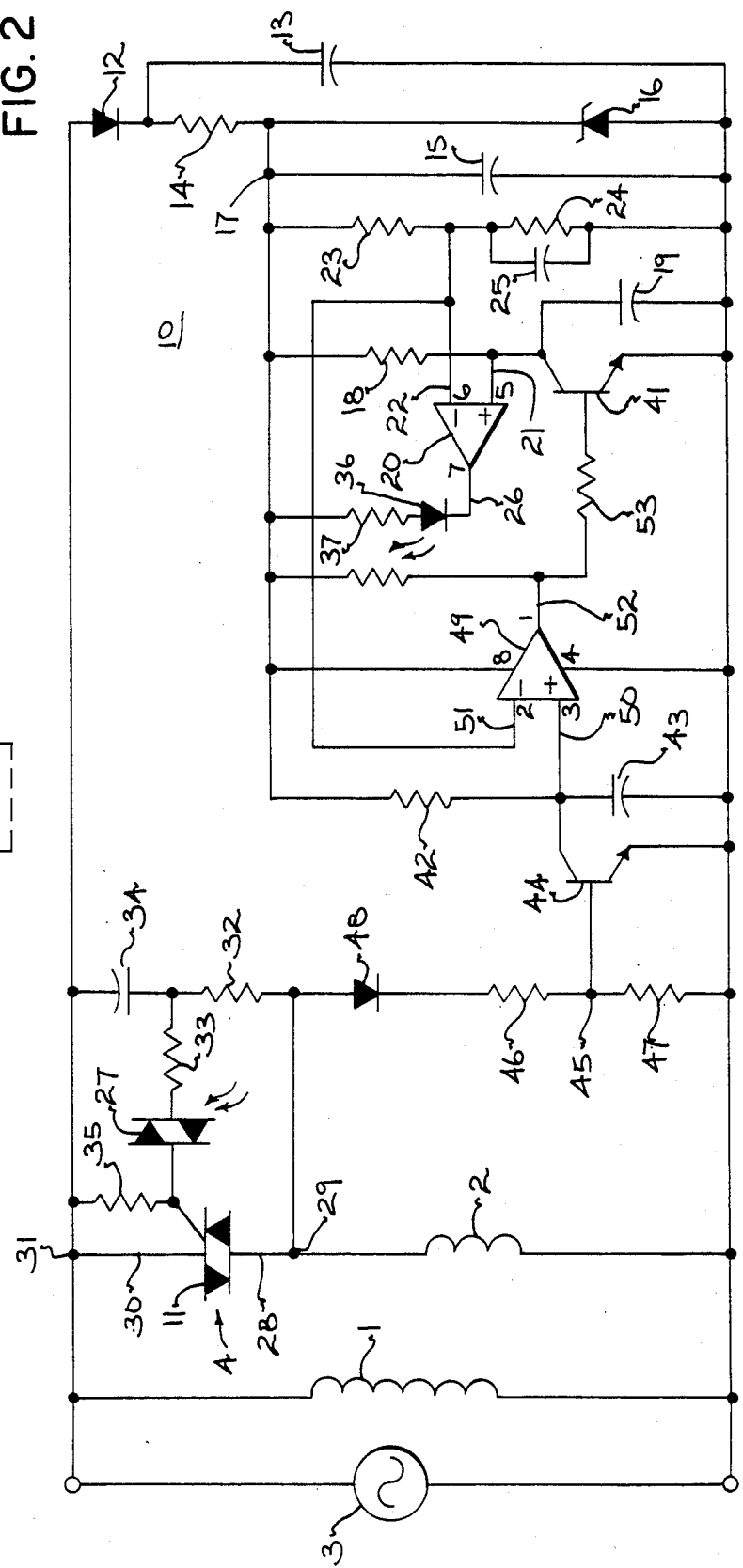
FIG.1
FIG.2

MOTOR CONTROL CIRCUIT WITH AUTOMATIC RESTART OF CUT-IN

BACKGROUND AND SUMMARY

The invention relates to disconnect switches for use with the start or auxiliary winding of a single phase AC induction motor A single phase AC induction motor typically includes a squirrel cage rotor and two stator windings—a main winding and a start or auxiliary winding. The main winding is connected across an AC supply line and normally has low resistance and high inductance. The start or auxiliary winding is physically displaced from the main winding and has high resistance and low inductance. In a split phase type AC motor, the physical displacement of the motor stator winding together with the electrical phase displacement produced by the different resistance and inductance values generates a rotating field sufficient to provide a low level starting torque. After the motor has accelerated to 75-80% of its synchronous speed (cut-out speed), a disconnect switch opens and the start winding is disconnected from the AC power source. The disconnect switch is typically a mechanical centrifugally actuated type switch.

Other types of single phase AC induction motors for higher torque applications include capacitor-start type motors and capacitor-start-run type motors. In these types of motors, a capacitor is connected in series with the auxiliary winding to provide higher starting torque. As with the above noted split phase type motor, the auxiliary starting circuit is opened by a disconnect switch after the motor has accelerated to approximately 75-80% of its synchronous speed (cut-out speed).

The present invention arose during continuing development efforts connected with pending U.S. Pat. application Ser. Nos. 06/680,488 and 06/680,489, filed Dec. 11, 1984, regarding efforts directed to replace the mechanical centrifugal disconnect switch assembly for the auxiliary winding. In FIG. 1, main winding 1 and auxiliary winding 2 of an AC motor are connectable to an AC power source 3. The motor circuit may be a split phase type, or a capacitor-start type as noted above. When the motor reaches a given threshold or cut-out speed, switch 4 is opened to disconnect auxiliary winding 2 from AC power source 3.

Various types of switches 4, and controls therefore, are known. In one arrangement, a centrifugal actuator is mounted on the shaft of the motor rotor. At a given threshold or cut-out speed, centrifugal weights are displaced radially outwardly to open the switch. While this type of actuation has proven useful for its intended purpose, it is nonetheless subject to the problems inherent in any mechanical type actuation system, including limited life, fatigue, friction, vibration, mounting position, contact wear, and so on. Also, the mechanical centrifugal switch has a radial extent and blocks axial air flow through the motor which may impair cooling. Furthermore, the mechanical centrifugal switch has a given axial extent, thus requiring extra axial room in the motor, which may be objectionable in applications where motor length is critical.

In another known start or auxiliary winding disconnect system, Hall effect sensors or pick-up coils are used to detect motor shaft RPM to actuate a start or auxiliary winding disconnect switch. This approach may be objectionable because of the requirement of adding an extra element such as a magnet on the motor shaft, and an associated pick-up coil to sense speed. These extra shaft mounted parts add to the motor length, and the associated assembly costs may be objectionable.

Another known disconnect approach is to sense total current through the main and auxiliary winding and then actuate the disconnect switch at a designated current magnitude. This requires a current sensor such as 5, FIG. 1. This sensor is in series with the main winding and the start or auxiliary winding, and is objectionable to many manufacturers because of the cost of matching the extra components to specific motor current ratings and the assembly cost of modifying the circuit and inserting such components in series in the circuit. This approach may also be objectionable due to the extra wattage and heat because current continues to flow through sensor 5 in the run mode while the motor is running, after starting.

In another disconnect system, a timer is started at initial energization of the motor. When the timer times out after a predetermined set timing interval, the disconnect switch is actuated to disconnect the auxiliary winding, i.e., switch 4 is turned off to disconnect winding 2 from AC source 3. This approach disconnects the auxiliary winding after the preselected time regardless of motor speed, and hence is limited to dedicated applications where the load on the motor is known beforehand, and the delay time set accordingly. If the motor speed is not up to a desired cut-out speed when the auxiliary winding is disconnected, the motor will stall, and will not restart even when the load is removed. Instead, the motor must be restarted.

The present invention addresses and solves the above noted and other problems in a particularly simple and cost effective manner. An electronic control system is provided for the auxiliary winding disconnect switch and provides automatic restarting cut-in or bumping of the motor speed if speed is not up to a desired cut-out speed when the auxiliary winding is disconnected. The auxiliary winding is automatically reconnected to provide additional starting torque, and if the motor still does not gain desired speed, the auxiliary winding is reconnected again, as needed, all without external intervention. Automatic multiple bumping of the motor speed during starting has been found particularly desirable in many applications.

BRIEF DESCRIPTION OF THE DRAWINGS

FIG. 1 schematically shows a typical environment in which the preferred embodiment of the invention is used.

FIG. 2 is a detailed circuit diagram illustrating a control circuit in accordance with invention.

DETAILED DESCRIPTION

Figure 3:
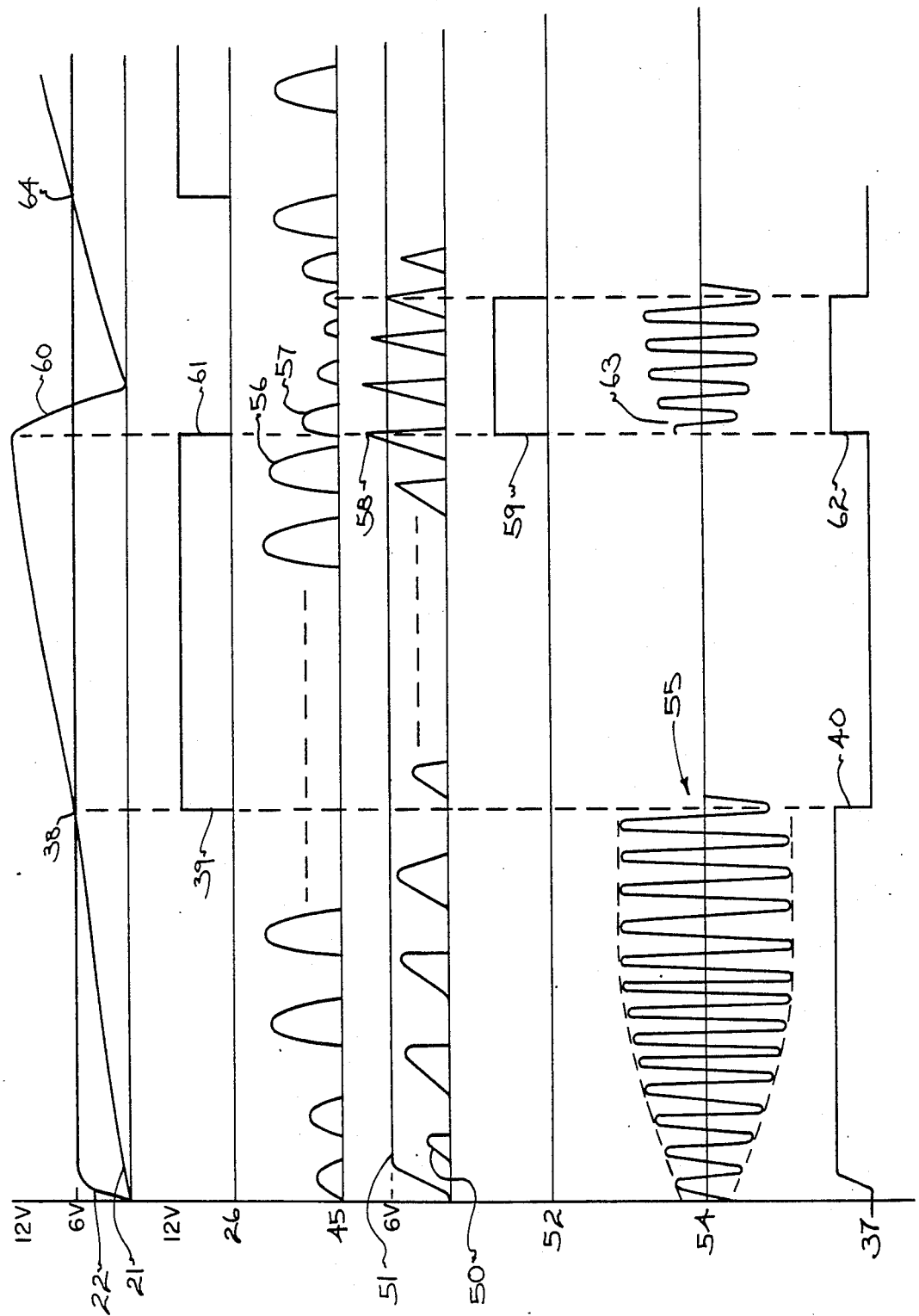
FIG. 3 is a timing diagram illustrating operation of the circuitry of FIG. 2.

FIG. 2 shows a control circuit 10 for use with a single phase AC induction motor having a main winding 1 and an auxiliary winding 2 both connectable to an AC power source 3, and having a disconnect power switch 4, for example provided by triac 11, for disconnecting auxiliary winding 2 from AC source 3. Circuit 10 provides automatic restart or cut-in of the motor by automatically reconnecting auxiliary winding 2 to AC source 3 to re-energize auxiliary winding 2 and reapply starting torque to the motor, and providing multiple reconnection or bumping as needed, to be described.

Reference voltage means are provided for deriving a reference voltage from the main winding voltage through diode 12. The reference voltage power supply is provided through diode 12 as filtered by capacitor 13 and through resistor 14 filtered by capacitor 15 and clamped by zener diode 16 to provide a reference voltage at node 17. A first RC charging circuit is provided by resistor 18 and capacitor 19 coupled to the reference voltage supply at 17 and providing a timing interval according to charging of RC network 18, 19 by the reference voltage. A first comparator 20, which may be provided by half of a dual comparator chip such as an LM293N chip, and wherein manufacturer designated pin number assignments are shown for clarity, has an input at 21 coupled to RC network 18, 19, and an input at 22 coupled to the reference voltage through a voltage divider network formed by resistors 23 and 24 and filtering capacitor 25. Comparator 20 has an output 26 coupled to disconnect switch 4 via opto-coupler 27 and 36, to be described, to turn on switch 4 when the voltage of charging capacitor 19 is below a given value relative to the reference voltage, and to turn off switch 4 when the RC charging voltage on capacitor 19 is above the noted given value, such that at initial energization of the motor, the RC charging voltage at input 21 on capacitor 19 is below the given value and switch 4 is turned on to connect auxiliary winding 2 to AC source 3, and when the RC charging voltage on capacitor 19 at input 21 rises above the given value relative to the reference voltage at input 22, the output 26 of comparator 20 transitions and turns off switch 4 to disconnect auxiliary winding 2 from AC source 3.

Switch 4 preferably comprises an optically isolated and driven triac, as known in the art, for example an MAC223-8, and will be only briefly described. Triac 11 is in series with auxiliary winding 2 across AC source 3, and has a gate circuit including a light responsive triac 27 for controlling conduction of power triac 11. Power triac terminal 28 is connected to auxiliary winding 2 at node 29, and power triac terminal 30 is connected to AC source 3 at node 31. When opto-triac 27 is triggered into conduction, gating current flows from node 29 through limiting resistors 32 and 33 and opto-triac 27 to bias power triac 11 into conduction such that starting current may flow through power triac 11. Capacitor 34 and resistor 32 provide a snubber network for opto-triac driver 27. Resistor 35 provides gate stability for the power triac.

A light emitting diode 36 and limiting resistor 37 are connected from node 17 to the output 26 of comparator 20. LED 36 is optically coupled to light responsive triac 27 to activate the latter and initiate conduction of power triac 11. When the voltage at input 21 of comparator 20 is higher than that at input 22, output 26 of the comparator is high, and hence no current will flow through LED 36, whereby no light will be emitted to triac 27 and hence power triac 11 will be off. When the voltage at input 21 is less than that at input 22, the output 26 of the comparator is low and current can then flow through LED 36 whereby light is emitted to opto-triac 27 which in turn enables gate current to trigger power triac 11 into conduction. At initial energization of the AC induction motor, the voltage at input 21 of the comparator is lower than that at input 22 because capacitor 19 has not yet charged. As capacitor 19 charges above a given value relative to the reference voltage, the voltage at input 21 becomes greater than that at input 22, and output 26 transitions high to thus stop conduction through LED 36 and hence terminate the emission of light to opto-triac 27 and hence turn off power triac 11.

The timing diagram in FIG. 3 shows at timing line 22 the voltage from the reference source, and at timing line 21 the voltage at the like numbered input to comparator 20 as capacitor 19 charges. When the voltage at 21 rises above that at 22, as shown at cross-over 38, the output of comparator 20 as shown at timing line 26 transitions high as shown at 39, at which time LED 36 transitions off as shown at 40.

A first switch 41, FIG. 2, for example provided by a bipolar transistor, is coupled to the first RC network 18, 19 for controlling charging thereof. Means is provided for sensing auxiliary winding voltage and is coupled to RC switch 41 to activate the latter and prevent charging of RC network 18, 19 above a given value when the auxiliary winding voltage is below a predetermined value corresponding to a designated motor speed, such as cut-in speed, such that the output 26 of comparator 20 turns on power triac 11 to reconnect auxiliary winding 2 to AC source 3. A second RC charging network is provided by resistor 42 and capacitor 43 coupled to the reference voltage means at node 17. A second RC switch provided by bipolar transistor 44 is coupled to auxiliary winding 2 and the second RC charging network 42, 43 and is responsive to auxiliary winding voltage below a predetermined value corresponding to a designated motor speed to control charging of capacitor 43. The base of transistor 44 at node 45 is coupled to auxiliary winding 2 through a voltage divider network provided by resistors 46 and 47 and a rectifying diode 48 to sense the voltage induced in auxiliary winding 2 due to motor rotation, when power triac 11 is off. Transistor 44 is turned on intermittently by the rectified pulses from diode 48 providing intermittent base drive at node 45, which in turn intermittently discharges capacitor 43 through the collector to emitter of transistor 44 to prevent charging of capacitor 43 above a given threshold. If motor speed decreases, then the amplitude and frequency of the pulses at node 45 also decreases, to in turn reduce the on time of transistor 44 and hence reduce the discharging of capacitor 43 through the collector to emitter of transistor 44, such that capacitor 43 now charges above the noted given threshold. Thus, if the motor does not achieve a desired speed, such as cut-out speed, upon initial starting, or if the motor stalls, stops or decreases in speed under an overload condition or the like, the intermittent pulsed on time of transistor 44 is reduced according to the reduced motor speed, and capacitor 43 charges to a higher value.

A second comparator 49 is provided by the other half of the noted LM293N chip, and manufacturer designated pin number assignments are again shown for clarity. Comparator 49 has an input 50 coupled to the second RC network 42, 43, and an input 51 coupled to the reference voltage source from node 17 through resistor 23 at input node 22 of the first comparator 20. Second comparator 49 has an output 52 coupled through limiting resistor 53 to the base of transistor 41 to activate the latter and prevent charging of the first RC network 18, 19 above the noted given value when the auxiliary winding voltage is below the noted predetermined value sensed by transistor 44 at node 45 controlling the charging of capacitor 43 at the input 50 of second comparator 49, such that the output 26 of first comparator 20 turns on power triac 11 to reconnect auxiliary winding 2 to AC source 3.

As shown in FIG. 3, intermittent rectified pulses are provided at node 45, and transistor 44 has sufficient on time to discharge capacitor 43 and prevent the pulses at comparator input 50 from rising above the reference at 51, such that the output 52 of comparator 49 stays low. During this time, power triac 11 is on and the current through auxiliary winding 2 is shown at 54 in FIG. 3. At the end of the timing interval set by first RC network 18, 19 as shown at crossover 38 of the rising voltage at comparator input 21 above the reference voltage at input 22, output 26 of comparator 20 transitions high at 39, LED 36 transitions off at 40 rendering opto-triac 27 nonconductive and in turn turning off power triac 11 thus disconnecting auxiliary winding 2 from AC source 3 and terminating current through auxiliary winding 2 as shown at 55. If the motor has not gained sufficient speed to induce enough voltage in auxiliary winding 2 to produce sufficient amplitude and frequency of pulses at node 45, for example as shown by the amplitude reduction at 56 and 57, then the on time of transistor 44 will not be great enough to sufficiently discharge capacitor 43 or otherwise prevent it from charging above the noted given threshold. When the charge of capacitor 43 rises above the noted given threshold, the amplitude of the pulse at comparator input 50, as shown at 58, rises above the reference at input 51, and output 52 transitions high at 59 thus triggering transistor 41 into conduction which in turn discharges capacitor 19, as shown at the falling potential at 60 of comparator input 21. The voltage at input 21 thus drops below the reference at input 22, and a restart or cut-in cycle is automatically initiated to re-apply starting torque to the motor. The output 26 of comparator 20 transitions low at 61, LED 36 turns on at 62 rendering opto-triac 27 conductive and in turn triggering power triac 11 into conduction thus reconnecting auxiliary winding 2 to AC source 3 as shown at reinitiated current flow 63 through auxiliary winding 2. This reconnection of auxiliary winding 2, or bumping of the motor, lasts until capacitor 19 charges above the reference at input 22, as at 64. If the motor still does not reach the desired or cut-out speed, the amplitude and frequency of pulses at node 45 still will not be great enough to provide enough on time of transistor 44 to discharge capacitor 43 or otherwise prevent it from charging above the noted given threshold, and the auxiliary winding will again be reconnected, providing a bumping action with each reconnection, and so on, providing multiple bumping action with multiple reconnections, all without external intervention.

It is recognized that various alternatives and modifications are possible within the scope of the appended claims.

I claim:

1. In an AC motor having a main winding and an auxiliary winding both connectable to an AC power source, and having a power switch for disconnecting said auxiliary winding from said AC source, an improved control for said power switch providing automatic cut-in restart of said motor, comprising:
   starting means for turning on said power switch to connect said auxiliary winding to said AC source at energization of said motor;
   disconnect means for turning off said power switch to disconnect said auxiliary winding from said AC source in response to a predetermined condition following said energization; and
   automatic restart means comprising:
   means for deriving a reference voltage from the main winding voltage;
   means for sensing auxiliary winding voltage; and
   means for comparing said reference voltage and said sensed auxiliary winding voltage and turning on said power switch to reconnect said auxiliary winding to said AC source to re-energize said auxiliary winding and re-apply starting torque to said motor when said sensed auxiliary winding voltage drops below a given value relative to said reference voltage derived from said main winding voltage,
   wherein said given value of said sensed auxiliary winding voltage relative to said reference voltage corresponds to a designated cut-out motor speed and wherein said automatic cut-in restart means turns on said power switch a second time after said first reconnection to again reconnect said auxiliary winding to said AC source if said motor until does not accelerate above said cut-out speed upon said first reconnection, to provide multiple bumping action with multiple reconnections, all without external intervention;
   timing means coupled to said disconnect means and providing said predetermined condition as a set interval of time following said energization, and wherein said automatic restart means is coupled to said timing means to reset said timing means and automatically restart said time interval;
   wherein said timing means comprises:
   an RC charging network having a resistor and a capacitor and providing said time interval by charging said capacitor;
   second comparing means for comparing said reference voltage and the voltage of said capacitor to turn off said power switch to disconnect said auxiliary winding from said AC source;
   and wherein said automatic cut-in restart means comprises an RC switch coupled to said charging capacitor and activated by said first mentioned comparing means to discharge said capacitor when said sensed auxiliary winding voltage drops to said given value relative to said reference voltage.

2. The invention according to claim 1 wherein said sensing means of said automatic cut-in restart means comprises:
   a second RC charging network having a resistor and a capacitor coupled to said first mentioned comparing means; and
   a second RC switch coupled to said second mentioned capacitor and activated by said auxiliary winding voltage such that when said auxiliary winding voltage is above said given value said second RC switch is conductive and discharges said second capacitor to prevent charging of the latter, and such that when said auxiliary winding voltage is below said given value said second RC switch is nonconductive and enables charging of said second capacitor such that said first comparing means activates said first RC switch to discharge said first capacitor and reconnect said auxiliary winding to said AC source.

3. In an AC motor having a main winding and an auxiliary winding both connectable to an AC power source, and having a power switch for disconnecting said auxiliary winding from said AC source, an improved control for said power switch providing automatic cut-in restart of said motor, comprising:

reference voltage means for deriving a reference voltage from the main winding voltage;

RC charging means having a resistor and a capacitor coupled to said reference voltage means and providing a timing interval according to charging of said RC charging means by said reference voltage;

comparing means having inputs coupled respectively to said reference voltage means and said RC charging means having an output coupled to said power switch to turn on said power switch when the voltage of said RC charging means is below a given value relative to said reference voltage, and to turn off said power switch when said RC charging means voltage is above said given value, such that at initial energization of said motor, said RC charging means voltage is below said given value and said power switch is turned on to connect said auxiliary winding to said AC source, and when said RC charging means voltage rises above said given value relative to said reference voltage said comparing means turns off said power switch to disconnect said auxiliary winding from said AC source;

an RC switch coupled to said RC charging means for controlling charging thereof; and means for controlling charging thereof; and means for sensing auxiliary winding voltage and coupled to said RC switch to activate the latter and prevent charging of said RC charging means above said given value when said auxiliary winding voltage is below a predetermined value corresponding to a designated motor speed such that said output of said comparing means turns on said power switch to reconnect said auxiliary winding to said AC source to re-apply starting torque and restart said motor, and such that at the end of the restarted timing interval said auxiliary winding is again reconnected to said AC source if said motor speed is still below said designated speed.

4. In an AC motor having a main winding and an auxiliary winding both connectable to an AC power source, and having a power switch for disconnecting said auxiliary winding from said AC source, an improved control for said power switch providing automatic reconnection of said auxiliary winding to said AC source, comprising:

reference voltage means for deriving a reference voltage from the main winding voltage;

first RC charging means having a resistor and a capacitor coupled to said reference voltage means and providing a timing interval according to charging of said first RC charging means by said reference voltage;

first comparing means having inputs coupled respectively to said reference voltage means and said first RC charging means and having an output coupled to said power switch to turn on said power switch when the voltage of said first RC charging means is below a given value relative to said reference voltage, and to turn off said power switch when said first RC charging means voltage is above said given value, such that at initial energization of said motor said first RC charging means voltage is below said given value and said power switch is turned on to connect said auxiliary winding to said AC source, and when said first RC charging means voltage rises above said given value relative to said reference voltage said first comparing means turns off said power switch to disconnect said auxiliary winding from said AC source;

first RC switch means coupled to said first RC charging means for controlling charging thereof;

second RC charging means having a resistor and a capacitor coupled to said reference voltage means;

second RC switch means coupled to said auxiliary winding and said second RC charging means and responsive to auxiliary winding voltage below a predetermined value corresponding to a designated motor speed to control charging of said second RC charging means; and second comparing means having inputs coupled respectively to said reference voltage means and said second RC charging means and having an output coupled to said first RC switch means to activate the latter and prevent charging of said first RC charging means above said given value when said auxiliary winding voltage is below said predetermined value sensed by said second RC switch means controlling the charging of said second RC charging means at the input of said second comparing means, such that said output of said first comparing means turns on said power switch to reconnect said auxiliary winding to said AC source.

5. The invention according to claim 4 wherein said second RC switch means is coupled to said auxiliary winding through a voltage divider and a rectifying diode, said second RC switch means being turned on intermittently by rectified pulses from said diode and intermittently discharging said second RC charging means to prevent charging of the latter above a given threshold, and such that reduced motor speed reduces the amplitude and frequency of said pulses to in turn reduce the on time of said second RC switch means and in turn reduce the discharging of said second RC charging means such that the latter charges above said given threshold and said output of said second comparing means activates said first RC switch means to prevent charging of said first RC charging means such that the output of said first comparing means turns on said power switch to reconnect said auxiliary winding to said AC source.

* * * * *

UNITED STATES PATENT AND TRADEMARK OFFICE
CERTIFICATE OF CORRECTION

PATENT NO. : 4,658,195
DATED : April 14, 1987
INVENTOR(S) : Young-Kee Min

It is certified that error appears in the above-identified patent and that said Letters Patent is hereby corrected as shown below:

Claim 3, column 7, lines 23-25, delete "means for controlling charging thereof; and"

Signed and Sealed this

Nineteenth Day of January, 1988

Attest:

DONALD J. QUIGG

Attesting Officer

Commissioner of Patents and Trademarks